US008825281B2

(12) United States Patent
DeLarochelière et al.

(10) Patent No.: US 8,825,281 B2
(45) Date of Patent: Sep. 2, 2014

(54) VEHICLE TELEMETRY SYSTEM AND METHOD FOR EVALUATING AND TRAINING DRIVERS

(76) Inventors: Jacques DeLarochelière, Chambly (CA); David Brillon, La Prairie (CA); Jean-Sébastien Bouchard, Montreal (CA)

( * ) Notice: Subject to any disclaimer, the term of this patent is extended or adjusted under 35 U.S.C. 154(b) by 144 days.

(21) Appl. No.: 13/084,215

(22) Filed: Apr. 11, 2011

(65) Prior Publication Data

US 2011/0251752 A1 Oct. 13, 2011

Related U.S. Application Data

(60) Provisional application No. 61/322,573, filed on Apr. 9, 2010.

(51) Int. Cl.
*G01M 17/00* (2006.01)
*G06F 7/00* (2006.01)
*G06F 19/00* (2011.01)

(52) U.S. Cl.
USPC .......................................................... 701/33.4

(58) Field of Classification Search
USPC ................................. 701/FOR. 105, 33, 33.4
See application file for complete search history.

(56) References Cited

U.S. PATENT DOCUMENTS

2004/0210353 A1* 10/2004 Rice .................................. 701/1
2004/0236476 A1* 11/2004 Chowdhary ...................... 701/1

OTHER PUBLICATIONS http://liveweb.archive.org/http://www.isaac.ca/newsletter/images/RTVM%20-%20Map%20&%20Dashboard.jpg—dated Mar. 7, 2009.
http://web.archive.org/web/20090307000350/http://www.isaac.ca/—dated Mar. 7, 2009.
http://liveweb.archive.org/http://www.isaac.ca/newsletter/images/RTVM%20-%20Map%20&%20Dashboard.jpg
http://web.archive.org/web/20090307000350/http://www.isaac.ca/.

* cited by examiner

*Primary Examiner* — Mary Cheung
*Assistant Examiner* — Frederick Brushaber
(74) *Attorney, Agent, or Firm* — Benoît & Côté Inc.

(57) ABSTRACT

There is described a system and method for establishing a performance of at least one of a vehicle and an operator of the vehicle over a given period. In particular, the method comprises: recording measured vehicle parameters at a continuous rate over a given period, the continuous rate being at least as great as the rate of change of the measured vehicle parameters; calculating criteria using, for each criterion, a selection of the measured vehicle parameters; and outputting the criteria, the criteria being representative of a performance of at least one of the operator and the vehicle over the given period.

20 Claims, 8 Drawing Sheets

Truck - Fuel Economy

Operator No 1013 Start 01/11/2010 12:00:00 AM

Name Matthew Thompson End 01/12/2010 12:00:00 AM

| Vehicle | Description | Operating Time h:mm:ss | Distance km | Average Speed km/h | Driving Fuel Rate l/h | Driving Fuel Economy l/100km |
|---|---|---|---|---|---|---|
| 3 | Truck | 51:48:41 | 4,614.6 | 91.5 | 24.1 | 26.1 |
| | | 51:48:41 | 4,614.6 | 91.5 | 23.9 | 26.1 |

| Idle | Result | Target | Units |
|---|---|---|---|
| Count of excessive idles (+5min) | 8 | 0 | Qty |
| Duration of excessive idles (+5min) | 1:10:24 | 0:00:00 | h:mm:ss |

| Coasting (Anticipation) | Result | Target | Units |
|---|---|---|---|
| Coasting of +250m | 1.0 | 2.0 | Qty/100km |
| Coasting of +500m | 0.3 | 1.0 | Qty/100km |
| Coasting of +1000m | 0.1 | 0.5 | Qty/100km |

| Accelerator Pedal Position | Result | Target | Units |
|---|---|---|---|
| Accelerator Pedal <70% when Speed 0-70kmh | 92.7 | 90.0 | % |
| Accelerator Pedal <70% when Speed 70-105kmh | 89.3 | 90.0 | % |
| Accelerator Pedal <70% when Speed +105kmh | 87.1 | 90.0 | % |

| Turbo Boost | Result | Target | Units |
|---|---|---|---|
| Engine Turbo Boost <20PSI when speed +80kmh | 91.4 | 80.0 | % |

| Cruise Control | Result | Target | Units |
|---|---|---|---|
| Cruise Control Utilization | 29.7 | 0.0 | % |
| Good Cruise Control | 92.8 | 90.0 | % |

| Transmission | Result | Target | Units |
|---|---|---|---|
| Upshift RPM < 1400rpm | 89.9 | 75.0 | % |
| Downshift RPM < 1200 RPM | 80.3 | 90.0 | % |
| Up-hill downshift RPM < 1200 RPM | 37.5 | 90.0 | % |
| Top Gear | 94.3 | 80.0 | % |

| Vehicle Data | Result | Target | Units |
|---|---|---|---|
| Average Engine Horse Power | 109.0 | 0.0 | hp |
| Average Engine Load | 30.4 | 0.0 | % |

FIG. 3

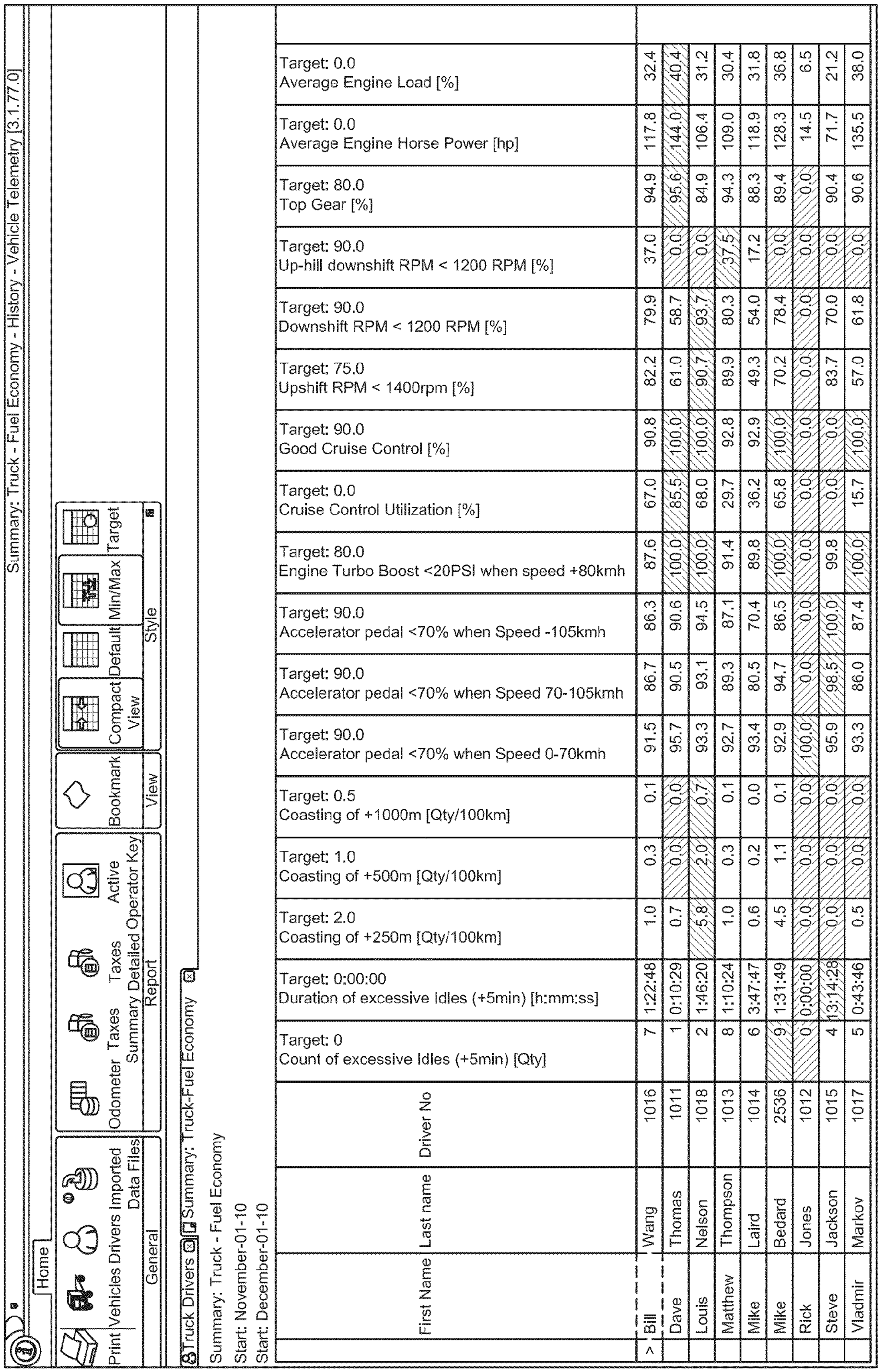

| First Name | Last name | Driver No | Target: 0<br>Count of excessive Idles (+5min) [Qty] | Target: 0:00:00<br>Duration of excessive Idles (+5min) [h:mm:ss] | Target: 2.0<br>Coasting of +250m [Qty/100km] | Target: 1.0<br>Coasting of +500m [Qty/100km] | Target: 0.5<br>Coasting of +1000m [Qty/100km] | Target: 90.0<br>Accelerator pedal <70% when Speed 0-70kmh | Target: 90.0<br>Accelerator pedal <70% when Speed 70-105kmh | Target: 90.0<br>Accelerator pedal <70% when Speed -105kmh | Target: 80.0<br>Engine Turbo Boost <20PSI when speed +80kmh | Target: 0.0<br>Cruise Control Utilization [%] | Target: 90.0<br>Good Cruise Control [%] | Target: 75.0<br>Upshift RPM < 1400rpm [%] | Target: 90.0<br>Downshift RPM < 1200 RPM [%] | Target: 90.0<br>Up-hill downshift RPM < 1200 RPM [%] | Target: 80.0<br>Top Gear [%] | Target: 0.0<br>Average Engine Horse Power [hp] | Target: 0.0<br>Average Engine Load [%] |
|---|---|---|---|---|---|---|---|---|---|---|---|---|---|---|---|---|---|---|---|
| > Bill | Wang | 1016 | 7 | 1:22:48 | 1.0 | 0.3 | 0.1 | 91.5 | 86.7 | 86.3 | 87.6 | 67.0 | 90.8 | 82.2 | 79.9 | 37.0 | 94.9 | 117.8 | 32.4 |
| Dave | Thomas | 1011 | 1 | 0:10:29 | 0.7 | 0.0 | 0.0 | 95.7 | 90.5 | 90.6 | 100.0 | 85.5 | 100.0 | 61.0 | 58.7 | 0.0 | 95.6 | 144.0 | 40.4 |
| Louis | Nelson | 1018 | 2 | 1:46:20 | 5.8 | 2.0 | 0.7 | 93.3 | 93.1 | 94.5 | 100.0 | 68.0 | 100.0 | 90.7 | 93.7 | 0.0 | 84.9 | 106.4 | 31.2 |
| Matthew | Thompson | 1013 | 8 | 1:10:24 | 1.0 | 0.3 | 0.1 | 92.7 | 89.3 | 87.1 | 91.4 | 29.7 | 92.8 | 89.9 | 80.3 | 37.5 | 94.3 | 109.0 | 30.4 |
| Mike | Laird | 1014 | 6 | 3:47:47 | 0.6 | 0.2 | 0.0 | 93.4 | 80.5 | 70.4 | 89.8 | 36.2 | 92.9 | 49.3 | 54.0 | 17.2 | 88.3 | 118.9 | 31.8 |
| Mike | Bedard | 2536 | 9 | 1:31:49 | 4.5 | 1.1 | 0.1 | 92.9 | 94.7 | 86.5 | 100.0 | 65.8 | 100.0 | 70.2 | 78.4 | 0.0 | 89.4 | 128.3 | 36.8 |
| Rick | Jones | 1012 | 0 | 0:00:00 | 0.0 | 0.0 | 0.0 | 100.0 | 0.0 | 0.0 | 0.0 | 0.0 | 0.0 | 0.0 | 0.0 | 0.0 | 0.0 | 14.5 | 6.5 |
| Steve | Jackson | 1015 | 4 | 13:14:29 | 0.0 | 0.0 | 0.0 | 95.9 | 98.5 | 100.0 | 99.8 | 0.0 | 0.0 | 83.7 | 70.0 | 0.0 | 90.4 | 71.7 | 21.2 |
| Vladmir | Markov | 1017 | 5 | 0:43:46 | 0.5 | 0.0 | 0.0 | 93.3 | 86.0 | 87.4 | 100.0 | 15.7 | 100.0 | 57.0 | 61.8 | 0.0 | 90.6 | 135.5 | 38.0 |

FIG. 5

VEHICLE TELEMETRY SYSTEM AND METHOD FOR EVALUATING AND TRAINING DRIVERS

CROSS-REFERENCE TO RELATED APPLICATIONS

This application claims priority from U.S. provisional application No. 61/322,573 filed on Apr. 9, 2011.

TECHNICAL FIELD

This specification relates to the field of vehicle testing and more particularly to automotive fleet management and systems for evaluating driving skills and performances.

BACKGROUND

Vehicle fleet testing and monitoring solutions are particularly useful for supervising a vehicle's position and/or speed, for example.

Prior art solutions are however typically limited for example in terms of data collection and accumulation, real-time monitoring capabilities, or simply in terms of the analyses and conclusions which can be taken using such data collected from a vehicle.

Compatibility issues are also problematic in that a variety of systems are only operational for specific brands or types of vehicles for example.

In view of prior art shortcomings, there exists a need for improved vehicle testing and monitoring systems and methods.

SUMMARY

In the present specification, the following terms are meant to be defined as indicated below:

The term "measured vehicle parameter" refers to the data obtained from sensors which concern a particular information relating to the operation or state of a vehicle. According to an embodiment, the measure vehicle parameters are recorded/acquired at a continuous rate over a given period. The continuous rate is at least as great as the rate of change of the measured vehicle parameters. Examples of parameters include, but are not limited to: wheel based vehicle speed, GPS latitude and longitude, engine speed, lateral or longitudinal acceleration, brake pedal position, etc.

The term "criteria" or "criterion" refers to a standard against which a performance of a vehicle or a vehicle operator can be measured. A selection of measured vehicle parameters is used for calculating criteria. Examples of criteria include, but are not limited to: coasting distance, RPM value when up shifting or down shifting, turning vs. time/distance, RPM value compared with route angle and gear, etc.

The term "trip" is intended to refer to a vehicle usage period extending from a departure time to an arrival time. Departure and arrival may be related to geographical locations which are different or the same (i.e. one-way or two-way). Vehicle usage during one trip does not need to be constant (e.g. stops can occur with re-starting of the engine).

The term "vehicle" is intended to refer to any man-piloted, motor-propelled transportation system, such as a truck, a bus, a car, a boat, an airplane and the like.

The term "profile" is intended to refer to variations of a driving maneuver with respect to time elapsed or distance traveled during a given period of vehicle usage. The profile can include variations in a specific criterion which is indicative of the driving maneuver.

The term "idle" is intended to refer to when a vehicle engine is running but the vehicle itself (or wheels in the case of a wheeled vehicle) is not moving.

The term "stop" is intended to refer to a period when the engine/motor of vehicle is turned off.

The term "drive/driving" is intended to refer to the action of piloting a vehicle during a period when the engine of the vehicle is running and movement of the vehicle occurs.

The term "hard braking" and "hard turning" is intended to refer to driving maneuvers for which a relatively large acceleration (in any direction) during a short amount of time. G-force measurements allow the determination of such vehicle accelerations.

The term "aggressive maneuvers" is intended to refer to any driving maneuver indicative of: turning while braking, accelerating while turning, aggressive, tight or sudden turning, excessively rapid and hard braking or any other generally prohibited maneuvers.

According to another embodiment, there is provided a remote processing center adapted for communication with a telemetry interface device installed in a vehicle controlled by an operator. The telemetry interface device is used for acquiring measured vehicle parameters. The remote processing center comprising: an input communication device for receiving the measured vehicle parameters; an output device; a processor operatively connected to the input communication device and to the output device; and a memory operatively connected to the processor and having instructions stored thereon to cause the processor: to obtain the measured vehicle parameters acquired at a continuous rate over a given period, the continuous rate being at least as great as the rate of change of the measured vehicle parameters; to calculate criteria using, for each criterion, a selection of the measured vehicle parameters; and to output the criteria on the output device, the criteria being representative of a performance of at least one of the operator and the vehicle over the given period.

According to another embodiment, each criterion is associated to a target and wherein the instructions further cause the processor to compare each criterion respectively to its associated target to determine a score for each criterion.

According to another embodiment, the instructions further cause the processor to generate a driving report comprising the score for each criterion for at least one of safety and fuel economy for the vehicle.

According to another embodiment, the remote processing center is adapted for communication with a plurality of telemetry interface devices installed in a respective vehicle of a plurality of vehicles controlled by a plurality of operators and wherein the input is for receiving the measured vehicle parameters from the plurality of telemetry interface devices.

According to another embodiment, the instructions further cause the processor to generate the driving report comprising the score for each criterion for a respective vehicle of the plurality of vehicles or for a respective operator of the plurality of operators.

According to another embodiment, the instructions further cause the processor to generate the driving report in a table format where one axis of the table is for the criteria and the other is for either the plurality of vehicles of for the plurality of operators, the table for placing the plurality of vehicles or the plurality of operators in order according to their score on a given criterion.

According to another embodiment, the output device comprises a display for displaying the criteria.

According to another embodiment, the vehicle parameters are geo-referenced and time-stamped, wherein the instructions further cause the processor to access and display a road map to show a mapping of the vehicle positions in time.

According to another embodiment, the matching of a threshold by a given criterion creates an event and wherein the instructions further cause the processor to determine and display a geographical location on the road map where and the time at which the event took place.

According to another embodiment, there is provided a vehicle telemetry system comprising: a telemetry interface device for installation in a vehicle controlled by an operator, the telemetry interface device for recording measured vehicle parameters at a continuous rate over a given period, the continuous rate being at least as great as the rate of change of the measured vehicle parameters; and a remote processing center comprising a processor for calculating criteria using, for each criterion, a selection of the measured vehicle parameters and for outputting the criteria, the criteria being representative of the performance of at least one of the operator and the vehicle over the given period.

According to another embodiment, the remote processing center comprises a display for displaying the criteria.

According to another embodiment, each criterion is associated to a target and wherein the processor is further for comparing each criterion respectively to its associated target to determine a score for each criterion.

According to another embodiment, a plurality of vehicles, controlled by a plurality of operators, are each equipped with the vehicle interface device, wherein the remote processing center receives the measured vehicle parameters of each one of the multiple vehicles, and further wherein the remote processing center is implemented to generate a driving report comprising the score for each criterion for a respective vehicle of the plurality of vehicles or for a respective operator of the plurality of operators.

According to another embodiment, there is provided a method for establishing a performance of at least one of a vehicle and an operator of the vehicle over a given period. The method comprises: recording measured vehicle parameters at a continuous rate over a given period, the continuous rate being at least as great as the rate of change of the measured vehicle parameters; calculating criteria using, for each criterion, a selection of the measured vehicle parameters; and outputting the criteria, the criteria being representative of a performance of at least one of the operator and the vehicle over the given period.

According to another embodiment, each criterion is associated to a target and wherein the method further comprises comparing each criterion respectively to its associated target to determine a score for each criterion.

According to another embodiment, the method further comprises generating a driving report comprising the score for each criterion for at least one of safety and fuel economy for the vehicle.

According to another embodiment, the recording comprises recording measured vehicle parameters for a plurality of telemetry interface devices installed in a respective vehicle of a plurality of vehicles controlled by a plurality of operators.

According to another embodiment, the generating comprises generating the driving report comprising the score for each criterion for a respective vehicle of the plurality of vehicles or for a respective operator of the plurality of operators.

According to another embodiment, the generating comprises generating the driving report in a table format where one axis of the table is for the criteria and the other is for either the plurality of vehicles of for the plurality of operators, the table for placing the plurality of vehicles or the plurality of operators in order according to their score on a given criterion.

According to another embodiment, the vehicle parameters are geo-referenced and time-stamped and wherein the method further comprises accessing and displaying a road map to show a mapping of the vehicle positions in time.

In accordance with an embodiment, the present specification provides a system for generating a driving profile associated with a vehicle for a given period, the system comprising: a remote processing center; a vehicle interface device for installation in operative communication with a set of sensors in the vehicle, the vehicle interface device comprising: a memory device for accumulating in a substantially uninterrupted manner over the given period, (vehicle activity data indicative of variations in vehicle parameters occurring in the given period); a processing device in communication with the memory device, the processing device being implemented to: receive sensor data from the sensors during the given period, record the sensor data as vehicle activity data in the memory device during the given period, the vehicle activity data being recorded at a sampling frequency allowing measurement of an instantaneous value therefrom; and a communication device for transmitting the vehicle activity data to the remote processing center; wherein the remote processing center comprises a processor implemented to: receive the vehicle activity data from the vehicle interface device; identify driving manoeuvres (events) from the vehicle activity data (by analysing the variations in the vehicle parameters), each one of the driving manoeuvres being characterized by a quantitative value (time elapsed, distance, speed, rpm, turbo pressure, internal accelerator measurement), and at least one of the driving manoeuvres being characterized by the instantaneous value; evaluate at least one of the driving manoeuvres identified as being one of a satisfactory driving manoeuvre and an unsatisfactory driving manoeuvre, by comparing at least one of the quantitative value and the instantaneous value of the at least one of the driving manoeuvres with a pre-set threshold, the pre-set threshold being dependent on a vehicle parameter associated with the at least one of the driving manoeuvres; and generate the driving profile based the satisfactory and the unsatisfactory driving manoeuvre.

In accordance with another embodiment, there is provided a vehicle interface device for installation in a vehicle, the system comprising: a port in operative communication with a vehicle bus, the vehicle bus comprising sensor data transferred thereon by a set of sensors in the vehicle; a memory device for accumulating vehicle activity data in a substantially uninterrupted manner, over a given period; a processing device in communication with the memory device, the processing device being implemented to: receive, via the port, the sensor data from the vehicle bus; record the sensor data as vehicle activity data in the memory device during the given period, the vehicle activity data being recorded at a sampling frequency allowing measurement of an instantaneous value therefrom; and a communication device operatively connected to one of the memory device and the processing device, for transmitting the vehicle activity data to a remote processing center, for use in the remote processing center to identify a driving manoeuvre therefrom, to evaluate the driving manoeuvre as being one of a satisfactory and an unsatisfactory driving manoeuvre, and to generate a driving profile indicative of the one of the satisfactory and the unsatisfactory driving manoeuvre.

In accordance with another embodiment, there is provided a method for generating a driving profile using vehicle activity data collected during a given period, the method comprising: receiving, from a vehicle interface device installed on a vehicle, vehicle activity data recorded in a substantially uninterrupted manner over the given period, and at a sampling frequency allowing measurement of an instantaneous value therefrom; identifying, from the vehicle activity data recorded and received, a driving manoeuvre occurring in the given period, the driving manoeuvre being characterized by the instantaneous value; comparing the instantaneous value with a pre-set threshold, the pre-set threshold being dependent on a type of the driving manoeuvre; evaluating the driving manoeuvre as being one of a satisfactory and an unsatisfactory driving manoeuvre based on the comparing; generating the driving profile based on the evaluating; and outputting the driving profile to indicate the one of the satisfactory and the unsatisfactory driving manoeuvre associated with the vehicle activity data.

BRIEF DESCRIPTION OF THE DRAWINGS

FIG. 3 is a driving report according to an embodiment;

FIG. 5 is a driving report in a table format where one axis of the table is for the criteria and the other is for the plurality of operators in accordance with an embodiment.

DETAILED DESCRIPTION

There is presented herein an automotive management system and method which, in addition to addressing prior art shortcomings, performs an evaluation of a driver based on recorded and analyzed measured vehicle parameters. A driving profile is generated from such evaluation, with information on driving actions, driving skills and overall driving performances. In an embodiment, the driving profile is adapted to provide educational driving insights and/or scores of various kinds, some of which are intended to address vehicle fuel consumption and/or safety issues for example. The herein presented system and method is, for example, applicable to provide assistance to fleet managers in attaining improved fleet efficiency via proper vehicle monitoring, driving evaluations and training.

Figure 1:
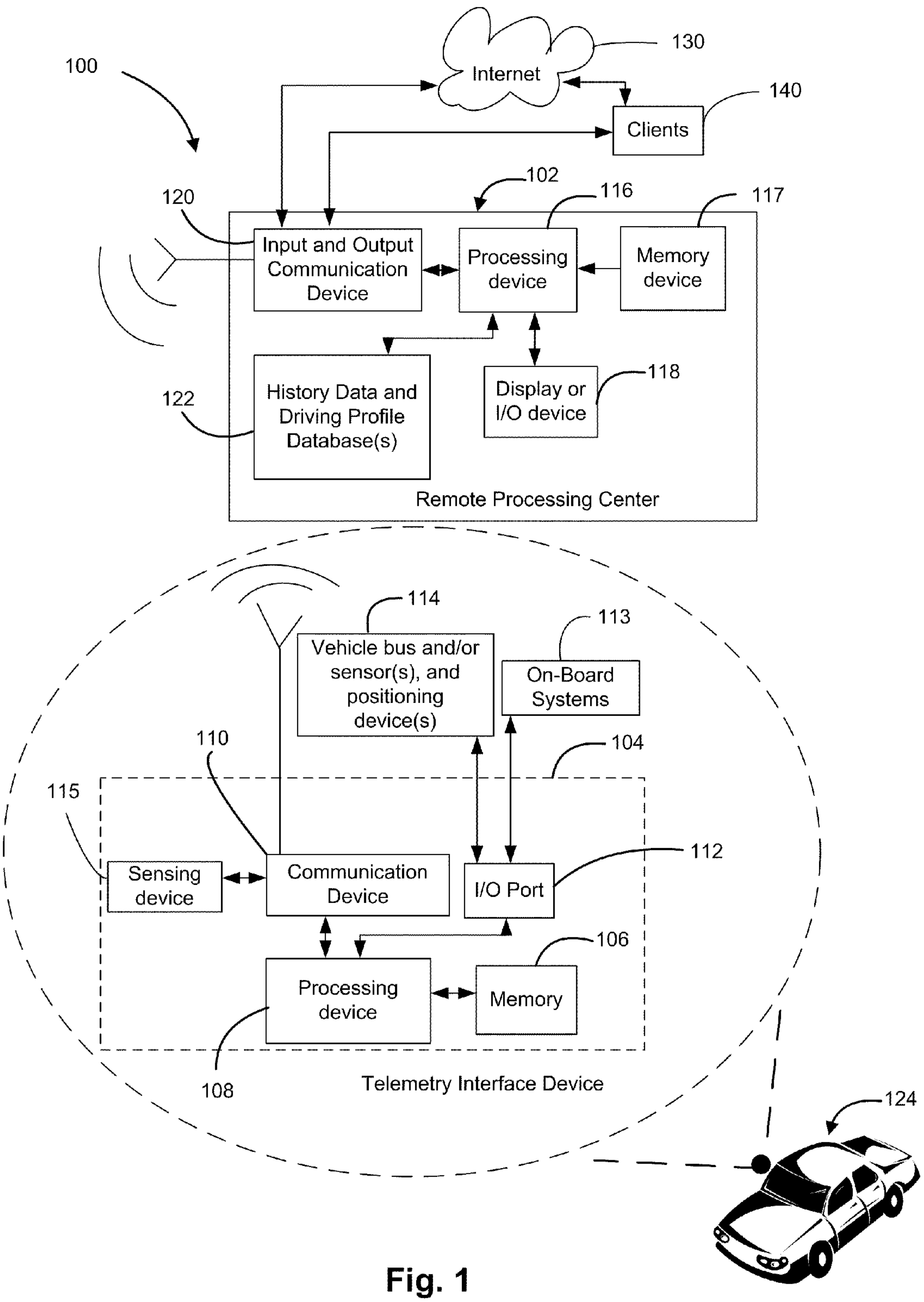
FIG. 1 is a schematic illustration of a system for generating a driving profile in accordance with an embodiment.

FIG. 1 illustrates a system for generating a driving profile in accordance with an embodiment. The system 100 has a remote processing center 102 and a telemetry interface device 104.

The telemetry interface device 104 is installed in the vehicle 124, in operative communication with a vehicle data bus and/or sensor(s) and positioning device(s) already on board the vehicle 124 (represented as element 114) and/or on-board systems such as a salt spreader or a passenger counter.

The telemetry interface device 104 comprises a memory device 106, a processing device 108 in communication with the memory device 106, and a communication device 110.

The Input/Output (I/O) port 112 allows for connectivity of the telemetry interface device 104 with at least one of a vehicle bus, an onboard sensor(s) and/or an optional positioning device; illustrated as element 114 and/or other on-board systems. I/O port 112 is any data connection port allowing uni- or bi-directional communication of data with the telemetry interface device 104.

In accordance with the specifics of each vehicle, the onboard sensor(s) and/or positioning device(s), as illustrated by element 114, are either in operative communication with the telemetry interface device 104 via the vehicle data bus, or directly in communication with the interface device 104.

The telemetry interface device 104 also has an optional sensing device(s) 115 usable to replace or supplement onboard sensor(s) and/or positioning device(s) for example. Such sensing device(s) 115 can be any sensing element such as an accelerometer for measuring the overall vehicle's acceleration (i.e., as a unit body) which is usable to monitor vehicle turns and breakings to determine any aggressive driving manoeuvres for example. The telemetry interface device may also be fitted with a Global Positioning System (GPS) receiver (not shown).

Still in reference to FIG. 1, the memory device 106 accumulates measured vehicle parameters in a substantially uninterrupted manner over a given period. Measured vehicle parameters refer to any vehicle parameter measurements being monitored from onboard the vehicle. Such measured vehicle parameters is indicative of any variations occurring in the monitored vehicle parameters during such given monitoring period. The given period is over a substantially continuous time, generally during vehicle operation time.

The processing device 108 is implemented to receive sensor data from at least one of the onboard sensor(s) and/or positioning device(s), as well as from the vehicle bus 114 and the sensing device(s) 115, during the given period. Once received such sensor data is recorded by the processing device 108 as measured vehicle parameters, on the memory device 106. The recording can take place during the given period, as soon as the sensor data is being sensed and received. The measured vehicle parameters are recorded at a sampling frequency (also referred to herein as a rate) which allows taking measurements of an instantaneous value from the recorded measured vehicle parameters. The definition of an in instantaneous value depends on a series of factor which are defined by the type of application in which the system is involved. Types of applications include for example Fleet Management, Durability Testing/Mission Profiling, and Prototype and Engineering Testing. In a Fleet Management application, 10 to 10,000 vehicles would be involved, 1 to 10 parameters are being monitored and the sampling rates vary from 0.1 to 1 samples/second. In a Durability Testing/Mission Profiling application, 10 to 100 vehicles would be involved, 1 to 100 parameters are being monitored and the sampling rates vary from 1 to 1,000 samples/second. In a Prototype and Engineering Testing application, 1 to 10 vehicles would be involved, 10 to 1,000 parameters are being monitored and the sampling rates vary from 100 to 1,000,000 samples/second.

Once the measured vehicle parameters are recorded, the communication device 110 transmits the recorded data to the remote processing center 102. Alternatively, the measured vehicle parameters may be sent directly or concurrently to the remote processing center without prior recording on the memory device 106, as long as the sampling frequency of the data is maintained.

Still in reference to FIG. 1, the remote processing center 102 comprises a processor 116 with internal and/or external memory (not shown); a display device or any other user input/output (I/O) device 118 (e.g., a printer port); and database(s) 122. The communication device 120 ensures reception of the measured vehicle parameters transmitted from the telemetry interface device 104. In an embodiment such as the one illustrated, the transmission is wireless. The remote processing center 102 and the telemetry interface device 104 communicate with each other over a network such as a cellular phone network or a local 900 MHz communication installed at select locations (e.g., parking lots for example).

The processor 116 is implemented using instructions stored in its internal and/or external memory 117. Coded instructions permit the processor 116 to receive the measured vehicle parameters from the telemetry interface device 104. Once the data is received, the processor identifies driving manoeuvres/criteria from the measured vehicle parameters; the driving manoeuvres identified thus occurred during the given period over which the measured vehicle parameters was accumulated. When the data can be analysed in real-time during its accumulation on board the vehicle, then the driving manoeuvres are actually occurring as they are being identified and later evaluated.

The identification of the driving manoeuvres/criteria is performed by analysing variations in the measured vehicle parameters pertaining to vehicle parameters for example. Each one of the driving manoeuvres is characterized by a quantitative value, while at least one of the driving manoeuvres identified is characterized by an instantaneous value as measured from the measured vehicle parameters.

Non-exhaustive examples of quantitative values associated with a driving manoeuvre include: a time elapsed, a distance traveled, and a vehicle speed as taken from a speed of the wheels. Non-exhaustive examples of instantaneous values associated with a driving manoeuvre include: a fuel flow rate, a rotations/revolutions per minute (RPM) of the motor, a turbo pressure, an engine throttle value, and vehicle acceleration such as that measured from an internal acceleration device and which is indicative of hard turns or braking as well as up-hill or down-hill routes for example.

The processor 116 is also implemented to evaluate at least one of the driving manoeuvres/criteria identified as being satisfactory or unsatisfactory. A comparison of each one of the driving manoeuvres identified with a threshold (or target) according to which a satisfactory driving becomes unsatisfactory is performed. The comparison involves detecting either a conformity or a deviation from the threshold or a set of threshold values.

The threshold is pre-set in accordance with technical specifications of a particular vehicle to be driven. Either the quantitative value or the instantaneous value characterizing a driving manoeuvre, or both, is compared with a corresponding pre-set threshold. Multiple threshold/target values can be preset for each criteria. The pre-set threshold/target applied in each comparison is dependent on the criteria under evaluation.

The processor 116 is implemented to generate a driving report based the satisfactory and the unsatisfactory evaluation of each one or at least one of the driving manoeuvres/criteria identified. The driving report lists each of the driving manoeuvres/criteria identified, presents a corresponding tag indicating whether the manoeuvre/criteria is satisfactory or not, and/or only provides an identification of an unsatisfactory manoeuvre/criteria. In an embodiment, when unsatisfactory driving manoeuvres are identified, corresponding satisfactory manoeuvre can be provided. Presentation of the driving report is adaptable to specific conditions (e.g., whether the viewer is a manager evaluating employees in terms of their driving efficiency or whether the viewer is a driver looking to improve their driving aptitudes). A mapping of a vehicle position over time can also be included in the driving profile (see FIG. 6, for example). The mapping is reconstructed by the processor 116 based on measured vehicle parameters recorded from the positioning device of element 114 or 104 in FIG. 1.

Still in reference to FIG. 1, the remote processing center 102 optionally comprises a report builder (not shown) or any type of a user interface which builds the driving profile in the form of a driving report. The report builder or user interface can perform specific formatting of data in the driving report so as to customize a presentation of the report. Graphs and tables, colors and any other suitable visual effect is used to create a contrast between acceptable and unacceptable driving aptitudes; aggressive manoeuvres to eliminate, and other inappropriate behaviours leading to increases in energy consumption or depreciation of vehicle parts for example.

The threshold values/targets used during the evaluation process described above are adaptable to different kinds of evaluations (e.g. fuel consumption reduction versus only security-wise). They are pre-set in order to evaluate a driving manoeuvre as being unsatisfactory when the qualitative or instantaneous value associated with the driving manoeuvre is known to be associated with an otherwise avoidable increase in fuel consumption; an aggressive driving manoeuvre; or an otherwise avoidable premature aging of a vehicle part.

Again in reference to FIG. 1, the remote processing center 102 optionally comprises a counter (not shown) for counting a number of occurrences of satisfactory and unsatisfactory driving manoeuvres. Alternatively, the processor is implemented with instructions to perform the counting when evaluating the driving manoeuvres identified. In addition to counting, a score (also referred to herein as a result) is allocated by the processor to each driving profile based on the number of occurrences of each unsatisfactory manoeuvre, per overall trip or per type of vehicle parameter associated to each driving manoeuvre. From the number of occurrences and a time interval elapsed during a manoeuvre, and/or a distance traveled, as defined by a qualitative value characterizing each manoeuvre, the processor is then able to determine a percentage of time taken by a subset of manoeuvres. Other kinds of analysis can be made based on the evaluation described hereinabove.

The display device 118 shown in FIG. 1 is used to output the driving profile for display. Alternatively or in combination, the display device 118 may be used to directly display the measured vehicle parameters as it is being received, in real-time, along with the events identified and driving scores calculated from the results in the driving profile.

Still in reference to FIG. 1, the database 122 is used to store historical data and/or prior driving profiles for example. Historical data can comprise: measured vehicle parameters associated with past vehicle trips or for which driving manoeuvres have already been identified in a past data processing, the driving manoeuvres identified from such past processing, or any other vehicle-related data useful for future reference. Data stored in the database(s) 122 is tagged with vehicle identification and driver identification such as a number, a name or any other distinguishing mark.

The vehicle telemetry system 100 illustrated in FIG. 1 is adaptable for use with a fleet of vehicles, wherein each vehicle is installed with the telemetry interface device 104. In such an embodiment, the remote processing center 102 receives measured vehicle parameters from all of the vehicle interface devices 104 of each one of the multiple vehicles. Identification numbers or distinct communication channels are used to distinguish data from each vehicle. The remote processing center 102 then proceeds to generate driving profiles in association with corresponding vehicles and/or drivers.

The vehicle telemetry system is accessible by a clients 140 through the internet 130 or directly (e.g., on a local network or any other form of direct communication) through input and output communication device 120.

Figure 2A:
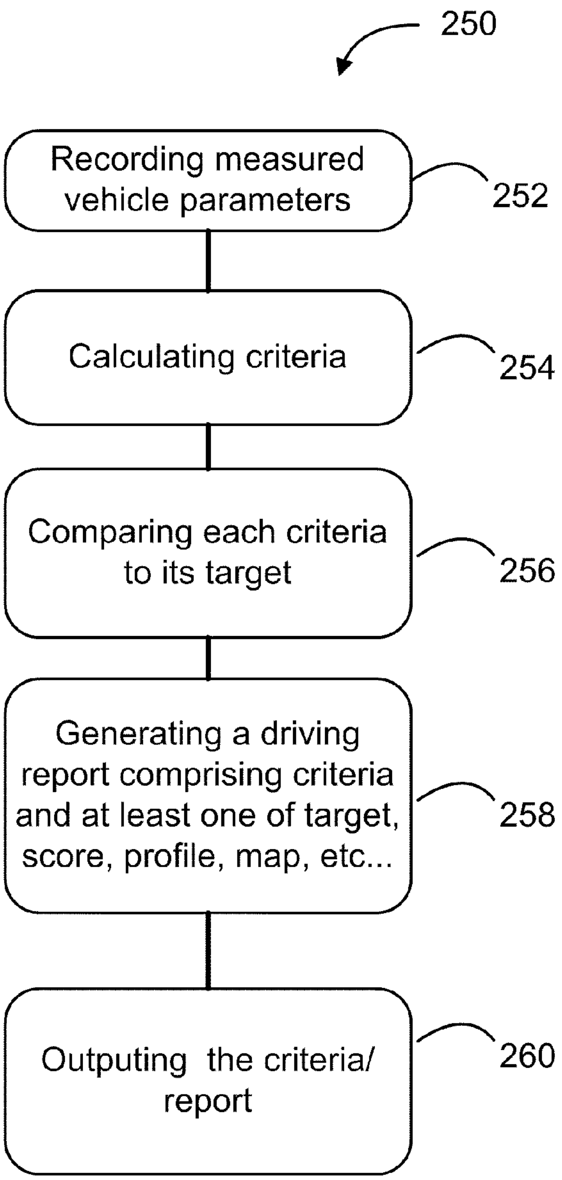
FIG. 2*a* is a flow chart illustrating a method establishing a performance of at least one of a vehicle and an operator of the vehicle over a given period in accordance with an embodiment.

Now in reference to FIG. 2*a*, a flow chart showing a method 250 for establishing a performance of at least one of a vehicle and an operator of the vehicle over a given period. The method comprises: recording measured vehicle parameters at a continuous rate over a given period, the continuous rate being at least as great as the rate of change of the measured vehicle parameters (step 252); calculating criteria using, for each criterion, a selection of the measured vehicle parameters (step 254); comparing each criteria to its target value (step 256); generating a driving report (step 258); and outputting the criteria, the criteria being representative of a performance of at least one of the operator and the vehicle over the given period.

Figure 2B:
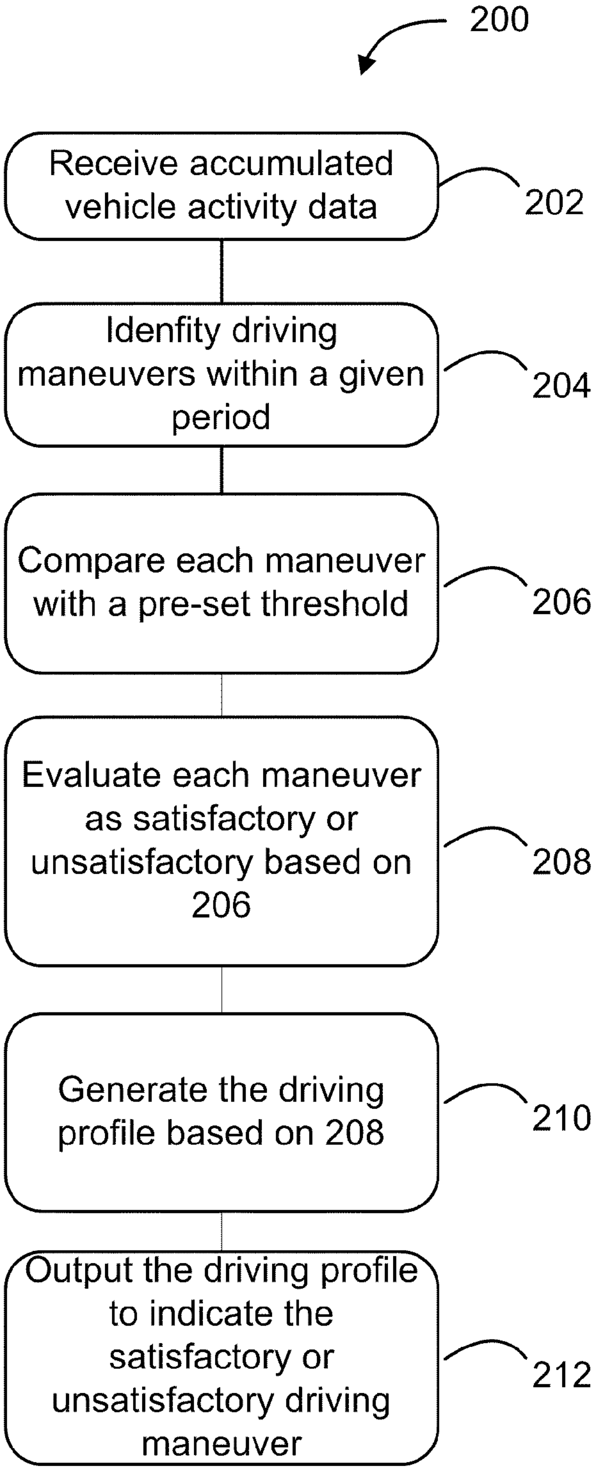
FIG. 2*b* is a flow chart of a method 200 for generating a driving profile from measured vehicle parameters is illustrated in accordance with an embodiment.

Now in reference to FIG. 2*b*, a flow chart of a method 200 for generating a driving profile from measured vehicle parameters is illustrated in accordance with an embodiment.

Starting at step 202, measured vehicle parameters is received from a telemetry interface device installed on a vehicle. The measured vehicle parameters is data indicative of vehicle activity as sensed by sensors on board of the vehicle, and which has been or is being recorded in a substantially uninterrupted manner over the given period. The measured vehicle parameters are received either in one block per vehicle trip or in real-time during a vehicle trip, as desired. The measured vehicle parameters however have a sampling frequency which allows for the measurement of an instantaneous value therefrom.

In step 204, a driving manoeuvre occurring in the given period is identified from the measured vehicle parameters recorded and received. This step involves the processing of the vehicle acidity data. Multiple driving manoeuvres may be identified over the given period, each manoeuvre comprising an optional qualitative value and an instantaneous value measured form the measured vehicle parameters, for a given vehicle parameter variation in time.

In step 206, for each driving manoeuvre identified, the instantaneous value and the optional qualitative value associated to the manoeuvre are compared with a pre-set threshold. This step involves detecting a deviation from a pre-set threshold, or a conformity with the pre-set threshold. The pre-set threshold is dependent on a type of the driving manoeuvre as defined by the given vehicle parameter from which the instantaneous value or the qualitative value is obtained.

In step 208, each manoeuvre identified is evaluated as being one of a satisfactory and an unsatisfactory driving manoeuvre. This evaluation step is based on the comparing of step 206.

In step 210, the driving profile is generated based on the evaluating of step 208.

In step 212, the driving profile, including information such as vehicle identification, driver identification, evaluation target and any other informative specification relative to the profile is outputted. Step 212 allows each one of the satisfactory and the unsatisfactory driving manoeuvres associated with the measured vehicle parameters of the vehicle to be viewed by a user. This step optionally involves the displaying of the profile on screen and/or the building of a report formatted for training purposes, with graphs and tags identifying target satisfactory driving manoeuvres to be preferred over the unsatisfactory driving manoeuvres detected.

Still in reference to FIG. 2 and method 200, step 204 optionally involves processing the measured vehicle parameters for a given period, in order to determine variations in vehicle parameters occurring at given times within the given period. Based on the variations and given times determined, step 204 also optionally involves identifying the multiple driving manoeuvres and associating to each a quantitative value and/or an instantaneous value as provided by a variation in one of the vehicle parameters. In such an embodiment, step 206 optionally involves comparing the quantitative value and the instantaneous value with corresponding and distinct pre-set thresholds. Still in such an embodiment, the method 200 optionally comprises another step (not illustrated) in which a distance travelled by the vehicle and a time interval elapsed during each one of the driving manoeuvres is determined based on the given times.

In the method 200, step 210 optionally involves generating and sending an electronic notification to a trainee driver or a manager that a driving profile for the trainee has been generated and is ready to be viewed.

Still in reference to FIG. 2, the method 200 optionally comprises another step (not shown) of accumulating in a historical database, the measured vehicle parameters received in step 202 for multiple, distinct, vehicle trips. In such an embodiment, step 204 to 210 are performed or repeated for a portion of the measured vehicle parameters accumulated in the historical database. The portion of data can be a user-defined portion.

FIG. 3 illustrates real-time monitoring and display of a driving profile on screen. Graphs and gauges show data as it is being received from the vehicle and processed. A user can thus monitor is vehicle fleet in real time as the vehicle are driven. Alarms, either visual or auditory, are optionally triggered when a driving maneuver is evaluated unsatisfactory.

Now in reference to the above description and the appended figures, measured vehicle parameters, driving manoeuvres and associated pre-set threshold examples are provided.

Measured Vehicle Parameters

A non-exhaustive, exemplary list of measured vehicle parameters monitored aboard the vehicle and sent to the remote processing center includes: Vehicle Speed; Engine RPM; Gear usage; Idles; Road Speed Governor usage; Braking (from monitoring of internal accelerometers); Turning (internal accelerometers); Brake pedal position; Accelerator pedal position; Cruise control usage; Engine turbo pressure (global and per gear); Engine torque; Fuel flow rate; Fuel mileage (qualitative measurement from vehicle bus fuel calculation) and GPS position.

Driving Manoeuvres and Their Evaluation

Figure 6:
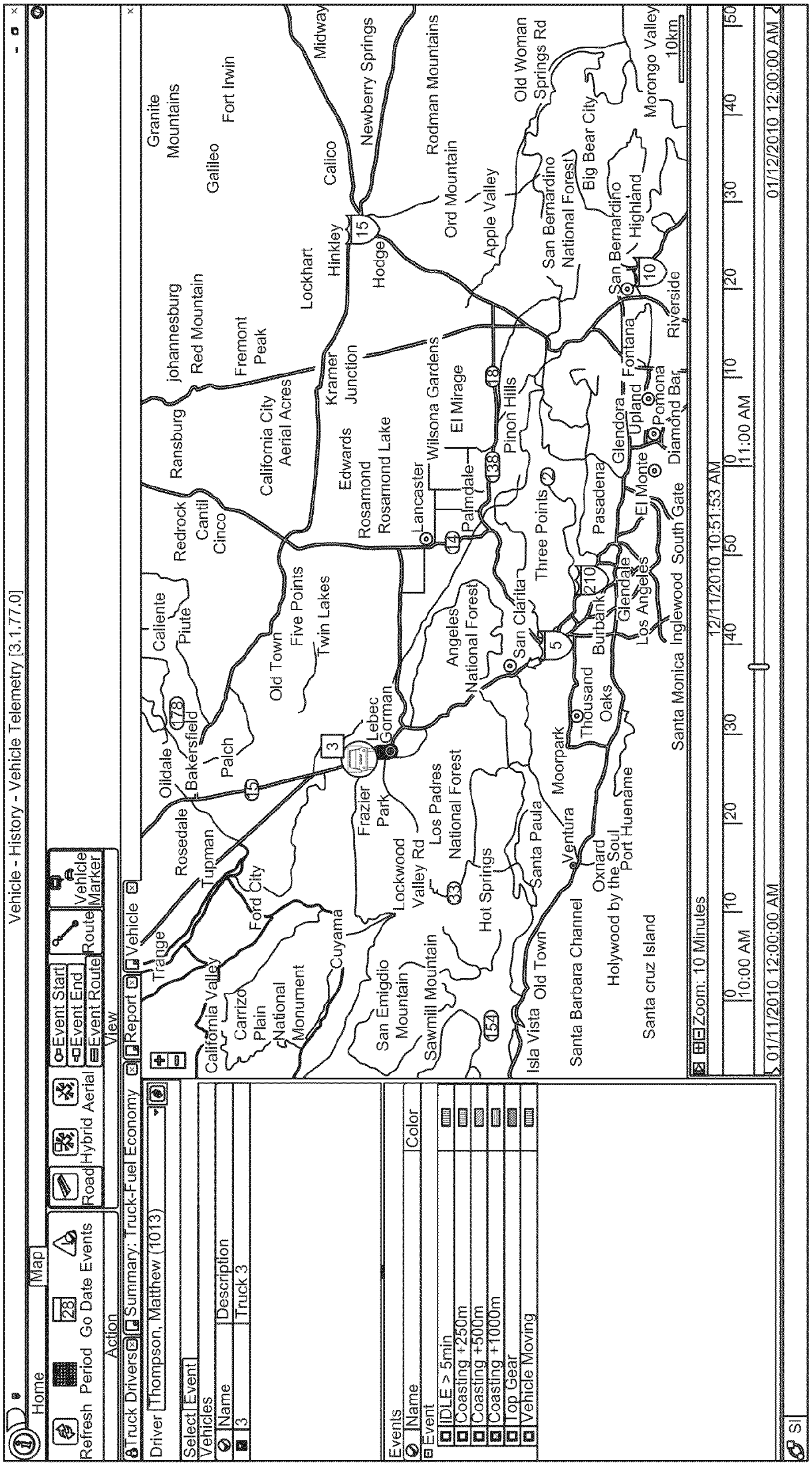
FIG. 6 is a map showing the location of occurrences of specified criteria in accordance with an embodiment.

A non-exhaustive, exemplary list of driving maneuvers possibly identified from the measured vehicle parameters is given in Table 1 below. FIG. 6 also illustrates a non-exhaustive list of possible driving manoeuvres, with their evaluation as could be shown in a driving profile report.

| DRIVING MANEUVERS/ CRITERIA | PRE-SET THRESHOLD EXAMPLES | EVALUATION | PARAMETERS REQUIRED FOR CALCULATION |
|---|---|---|---|
| Speed value at a given time or distance | >105 km/h<br><105 km/h | Unsatisfactory<br>Satisfactory | WheelBasedVehicleSpeed |
| Vehicle Speed in Geo-fenced Zones | 10 km/h above the zone speed limit | Unsatisfactory | WheelBasedVehicleSpeed<br>GPS_Lat<br>GPS_Long |
| RPM value at a given time/distance | 1500+ rpm | Unsatisfactory | EngSpeed |
| RPM value when downshifting in gear level | less than 1050 rpm<br>more than 1200 rpm<br>within 1050 and 1200 rpm | Unsatisfactory<br>Unsatisfactory<br>Satisfactory | WheelBasedVehicleSpeed<br>EngSpeed |
| RPM value when up-shifting in gear level | less than 1100 rpm<br>more than 1300 rpm<br>within 1000 and 1300 rpm | Unsatisfactory<br>Unsatisfactory<br>Satisfactory | WheelBasedVehicleSpeed<br>EngSpeed |
| Engine idle time | Time idle >5 minutes | Unsatisfactory | WheelBasedVehicleSpeed<br>EngSpeed |
| Coasting distance | 50 meters<br>100 meters<br>250 meters<br>500 meters<br>1000 meters | City versus Highway condition will differ | WheelBasedVehicleSpeed<br>BrakeSwitch<br>AccelPedalPosition<br>RetarderActive |
| RPM value compared with route angle and gear: RPM value when up-hill road and downshifting | <1050 rpm<br>>1200 rpm<br>1050-1200 rpm | Unsatisfactory<br>Unsatisfactory<br>Satisfactory | WheelBasedVehicleSpeed<br>EngSpeed<br>TurboBoostPressure |
| Braking versus time/distance (from accelerometers sensed value) | Vehicle longitudinal acceleration indicative of hard braking | Unsatisfactory | Longitudinal Accelerometer<br>WheelBasedVehicleSpeed |
| Turning versus time/distance (from accelerometers sensed value) | Vehicle lateral acceleration indicative of hard turning, left or right | Unsatisfactory | Lateral Accelerometer<br>WheelbasedVehicleSpeed |
| Braking versus time/distance (from pedal deflection value) | Excessive pedal deflection indicating of hard braking | Unsatisfactory | BrakePedalPosition |
| Braking count versus speed value at a given time | Within 80-90 km/h<br>Higher than 90 km/h<br>Within 50-80 km/h<br>Lower than 50 km/h | City versus Highway condition will differ | BrakeSwitch_1<br>WheelBaseVehicleSpeed |
| Engine turbo pressure value and speed value at a given time when road speed regulator engaged | Turbo >20 psi; and speed >90 km/h | Unsatisfactory | TurboBoostPressure<br>WheelBasedVehicleSpeed |
| Good or Bad Cruise Control Utilization | Cruise Control Active and Turbo >20 PSI | Unsatisfactory | CruiseControlActive<br>TurboBoostPressure |
| Engine turbo pressure value at given time/distance | Turbo <20 psi<br>Turbo >20 psi | Satisfactory<br>Unsatisfactory | TurboBoostPressure |
| Accelerator pedal position at a given time/distance, city versus highway | Pedal position lower than 75% deflection | Satisfactory | AcceleratorPedalPos<br>WheekBasedVehicleSpeed |
| Fuel flow rate at a given time/distance | More than 40 liters/hour<br>Less than 40 liters/hour | Unsatisfactory<br>Satisfactory | EngineFuelRate |
| % of distance driven on the highway | | | WheelBasedVehicleSpeed |
| % of distance driven in the city | | | WheelBasedVehicleSpeed |
| Average Horse Power | | | ActualEngPercentTorque<br>EngSpeed |
| Average Vehicle Load | | | ActualEngPercentTorque |
| Average carried weight | | | AxleSuspensionPressure |
| Topgear versus time or distance | Topgear for <90% of the distance | Unsatisfactory | WheelBasedVehicleSpeed<br>EngSpeed |

For each of the above-listed driving maneuver examples, Table 1 lists a set of pre-set thresholds/targets. These are used to evaluate the maneuvers/criteria as satisfactory or not. Pre-set thresholds are values or ranges of time (minutes, seconds), distance (meters, kilometers), RPM (number of rotations per minute), speed (kilometer per hour—km/h), engine turbo pressure (pounds per square inch—psi), pedal deflection in percentage, and the like. In an embodiment, each threshold range/value is associated with either a satisfactory mention or an unsatisfactory mention. For example, to evaluate a driving technique known as "progressive shifting", engine rotation (RPM) and gear level (up-shifting and downshifting actions) are compared in time. If a driver of a stick-shift vehicle for example, performs down-shifting when the rotation of the engine is not according to a pre-set most efficient rotation range, then the driver's progressive shifting technique is not optimal; training would be beneficial.

It should be noted that variances are allowable by which a driving maneuver within say about 10% of a threshold is still characterized as either one of satisfactory or unsatisfactory or in another mid-level category for example. Other variances can be made allowable.

The analysis of the driving maneuvers allows the generation of a driving profile. In an embodiment, the driving profile summarizes the different driving information, as collected from the onboard telemetry interface device detailed above in reference to FIG. 1.

Figure 4:
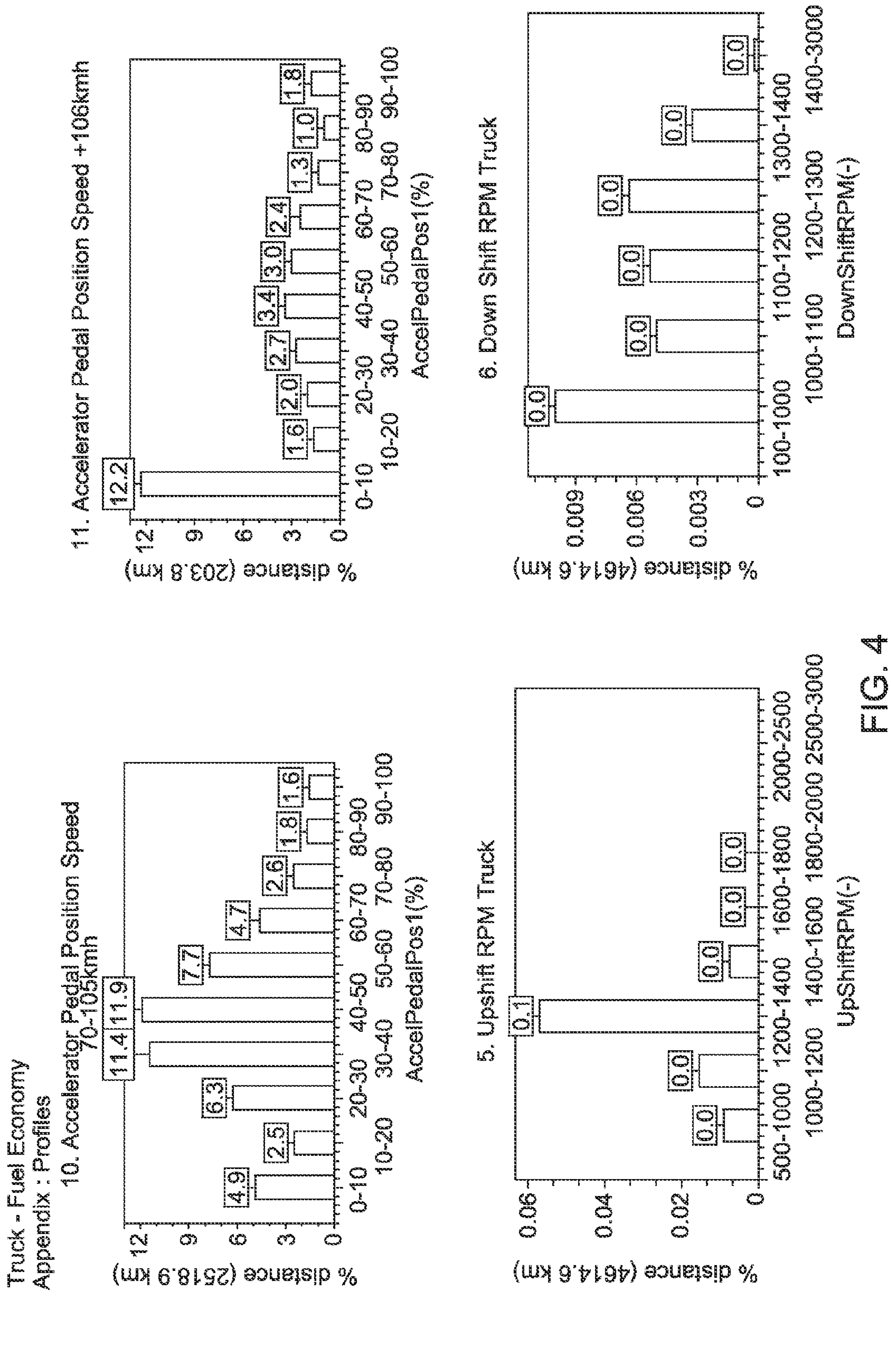
FIG. 4 shows various graphs which illustrate driving profiles in accordance with an embodiment.
Figure 4:
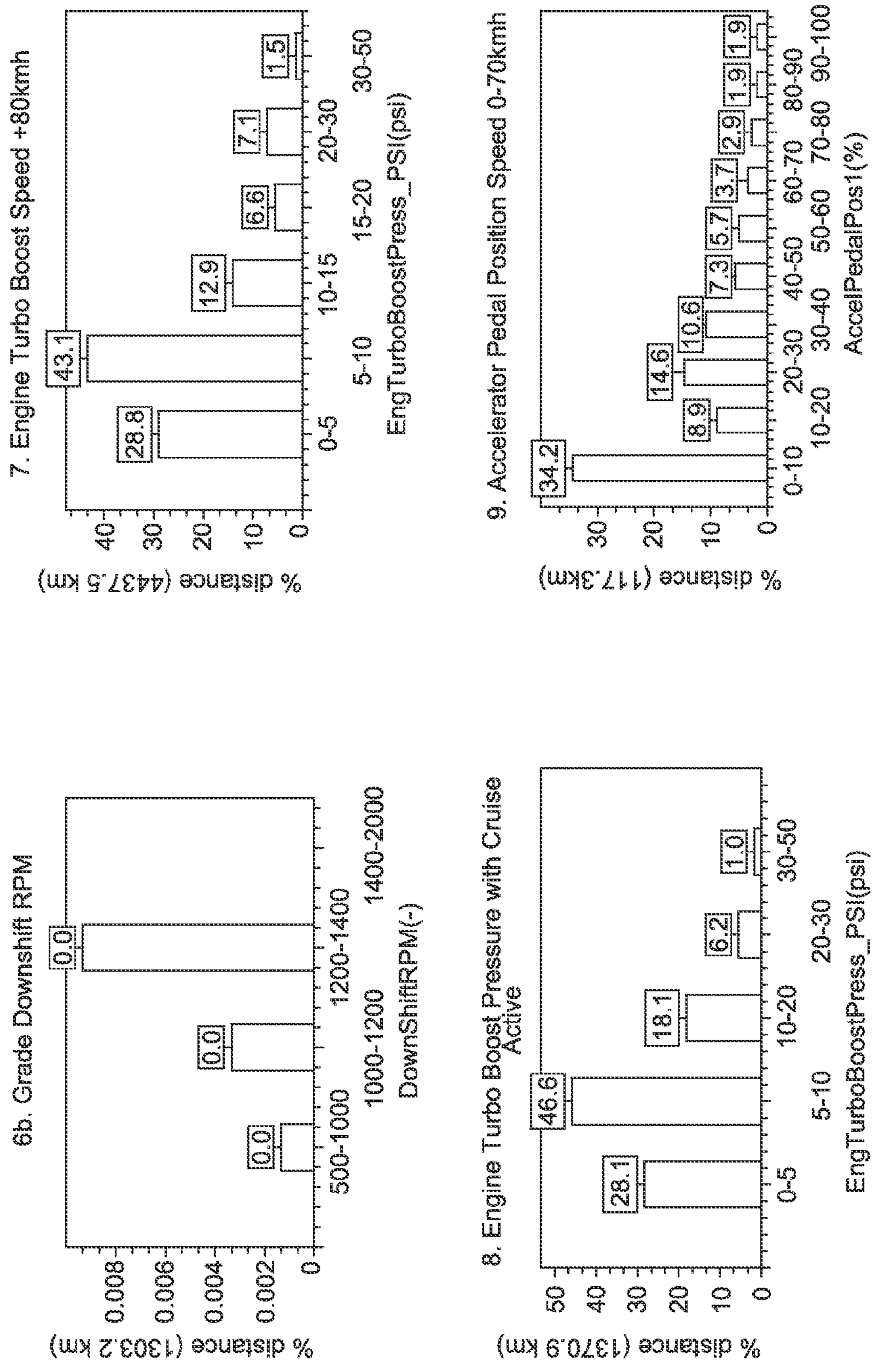

FIG. 3 is a driving report as discussed above according to an embodiment. FIG. 4 shows various graphs which illustrate driving profiles in accordance with an embodiment. FIG. 5 is a driving report in a table format where one axis of the table is for the criteria and the other is for the plurality of operators in accordance with an embodiment. Finally, FIG. 6 is a map showing the location of occurrences of specified criteria in accordance with an embodiment.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

While preferred embodiments have been described above and illustrated in the accompanying drawings, it will be evident to those skilled in the art that modifications may be made therein without departing from the intended scope of this specification. Such modifications are therefore considered as possible variants forming part of this specification.

The invention claimed is:

1. A remote processing center adapted for communication with a telemetry interface device installed in a vehicle controlled by an operator, the telemetry interface device used for acquiring measurements of vehicle parameters, the remote processing center comprising:

an input communication device for receiving the measurements of vehicle parameters; an output device;

a processor operatively connected to the input communication device and to the output device; and a memory operatively connected to the processor and having instructions stored thereon to cause the processor:

to obtain the measurements of vehicle parameters acquired at a continuous rate over a given period, the continuous rate being at least as great as the rate of change of each of the measurements of vehicle parameters over the given period; to calculate criteria using, for each criterion, a selection of the measurements of vehicle parameters; and to output the criteria on the output device, the criteria being representative of a performance of at least one of the operator and the vehicle over the given period;

wherein the continuous rate and the rate of change of each of the measurements are time period-based rates having a unit of time in the numerator or denominator.

2. The remote processing center of claim 1, wherein each criterion is associated to a target and wherein the instructions further cause the processor to compare each criterion respectively to its associated target to determine a score for each criterion.

3. The remote processing center of claim 2, wherein the instructions further cause the processor to generate a driving report comprising the score for each criterion for at least one of safety and fuel economy for the vehicle.

4. The remote processing center of claim 3, wherein the remote processing center is adapted for communication with a plurality of telemetry interface devices installed in a respective vehicle of a plurality of vehicles controlled by a plurality of operators and wherein the input is for receiving the measurements of vehicle parameters from the plurality of telemetry interface devices.

5. The remote processing center of claim 4, wherein the instructions further cause the processor to generate the driving report comprising the score for each criterion for a respective vehicle of the plurality of vehicles or for a respective operator of the plurality of operators.

6. The remote processing center of claim 5, wherein the instructions further cause the processor to generate the driving report in a table format where one axis of the table is for the criteria and the other is for either the plurality of vehicles of for the plurality of operators, the table for placing the plurality of vehicles or the plurality of operators in order according to their score on a given criterion.

7. The remote processing center of claim 1, wherein the output device comprises a display for displaying the criteria.

8. The remote processing center of claim 7, wherein the vehicle parameters are geo-referenced and time-stamped, wherein the instructions further cause the processor to access and display a road map to show a mapping of the vehicle positions in time.

9. The remote processing center of claim 8, wherein the matching of a threshold by a given criterion creates an event and wherein the instructions further cause the processor to determine and display a geographical location on the road map where and the time at which the event took place.

10. A vehicle telemetry system comprising:

a telemetry interface device for installation in a vehicle controlled by an operator, the telemetry interface device for recording measurements of vehicle parameters at a continuous rate over a given period, the continuous rate being at least as great as the rate of change of each of the measurements of vehicle parameters over the given period; and a remote processing center comprising a processor for calculating criteria using, for each criterion, a selection of the measurements of vehicle parameters and for outputting the criteria, the criteria being representative of the performance of at least one of the operator and the vehicle over the given period;

wherein the continuous rate and the rate of change of each of the measurements are time period-based rates having a unit of time in the numerator or denominator.

11. The system of claim 10, wherein the remote processing center comprises a display for displaying the criteria.

12. The system of claim 10, wherein each criterion is associated to a target and wherein the processor is further for comparing each criterion respectively to its associated target to determine a score for each criterion.

13. The system of claim 12, wherein a plurality of vehicles, controlled by a plurality of operators, are each equipped with the vehicle interface device, wherein the remote processing center receives the measurements of vehicle parameters of each one of the multiple vehicles, and further wherein the remote processing center is implemented to generate a driving report comprising the score for each criterion for a respective vehicle of the plurality of vehicles or for a respective operator of the plurality of operators.

14. A method for establishing a performance of at least one of a vehicle and an operator of the vehicle over a given period, the method comprising:

recording measurements of vehicle parameters at a continuous rate over a given period, the continuous rate being at least as great as the rate of change of each of the measurements of vehicle parameters over the given period;

calculating criteria using, for each criterion, a selection of the measurements of vehicle parameters; and outputting the criteria, the criteria being representative of a performance of at least one of the operator and the vehicle over the given period;

wherein the continuous rate and the rate of change of each of the measurements are time period-based rates having a unit of time in the numerator or denominator.

15. The method of claim 14, wherein each criterion is associated to a target and wherein the method further comprises comparing each criterion respectively to its associated target to determine a score for each criterion.

16. The method of claim 15, further comprising generating a driving report comprising the score for each criterion for at least one of safety and fuel economy for the vehicle.

17. The method of claim 16, wherein the recording comprises recording measurements of vehicle parameters for a plurality of telemetry interface devices installed in a respective vehicle of a plurality of vehicles controlled by a plurality of operators.

18. The method of claim 17, wherein the generating comprises generating the driving report comprising the score for each criterion for a respective vehicle of the plurality of vehicles or for a respective operator of the plurality of operators.

19. The method of claim 18, wherein the generating comprises generating the driving report in a table format where one axis of the table is for the criteria and the other is for either the plurality of vehicles of for the plurality of operators, the table for placing the plurality of vehicles or the plurality of operators in order according to their score on a given criterion.

20. The method of claim 14, wherein the vehicle parameters are geo-referenced and time-stamped and wherein the method further comprises accessing and displaying a road map to show a mapping of the vehicle positions in time.

* * * * *

UNITED STATES PATENT AND TRADEMARK OFFICE

CERTIFICATE OF CORRECTION

PATENT NO. : 8,825,281 B2
APPLICATION NO. : 13/084215
DATED : September 2, 2014
INVENTOR(S) : Jacques DeLarochelliere, David Brillon and Jean Sébastien Bouchard It is certified that error appears in the above-identified patent and that said Letters Patent is hereby corrected as shown below:

ON THE TITLE PAGE

The last name of the first inventor is spelled wrong. The error is located on the first page of the patent, item no. 76 (Inventors) . The full name should be as follows:

Jacques DeLarochelliere

Signed and Sealed this
Fourteenth Day of April, 2015

Michelle K. Lee
*Director of the United States Patent and Trademark Office*